US009910157B2

(12) United States Patent
Heo et al.

(10) Patent No.: US 9,910,157 B2
(45) Date of Patent: Mar. 6, 2018

(54) VEHICLE AND LANE DETECTION METHOD FOR THE VEHICLE

(71) Applicant: Hyundai Motor Company, Seoul (KR)

(72) Inventors: MyungSeon Heo, Seoul (KR); Kicheol Shin, Gyeonggi-do (KR); Youngchul Oh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 187 days.

(21) Appl. No.: 14/955,508

(22) Filed: Dec. 1, 2015

(65) Prior Publication Data

US 2017/0059713 A1    Mar. 2, 2017

(30) Foreign Application Priority Data

Aug. 31, 2015 (KR) ........................ 10-2015-0123002

(51) Int. Cl.
| | |
|---|---|
| *B60W 30/12* | (2006.01) |
| *G01S 17/93* | (2006.01) |
| *G06K 9/00* | (2006.01) |
| *G01S 7/48* | (2006.01) |
| *G06K 9/46* | (2006.01) |

(52) U.S. Cl.
CPC .......... *G01S 17/936* (2013.01); *B60W 30/12* (2013.01); *G01S 7/4802* (2013.01); *G06K 9/00798* (2013.01); *G06K 9/4642* (2013.01); *B60W 2420/52* (2013.01)

(58) Field of Classification Search
CPC .... G01S 17/936; G01S 7/4802; B60W 30/12; B60W 2420/52; G06K 9/00798; G06K 9/4642
See application file for complete search history.

(56) References Cited

U.S. PATENT DOCUMENTS

| | | | |
|---|---|---|---|
| 2015/0325127 A1* | 11/2015 | Pandita | ..................... G08G 1/16 701/431 |
| 2017/0001642 A1* | 1/2017 | Kumai | .................. B60W 30/16 |

FOREIGN PATENT DOCUMENTS

| | | |
|---|---|---|
| JP | H07248382 A | 9/1995 |
| JP | H 11-85274 A | 3/1999 |
| JP | 2004-139338 A | 5/2004 |
| JP | 2011-210165 A | 10/2011 |
| JP | 2015-514034 A | 5/2015 |
| KR | 10-2009-0098167 A | 9/2009 |
| KR | 10-2011-0051531 | 5/2011 |
| KR | 10-2013-0130106 | 12/2013 |
| KR | 10-1394574 B1 | 5/2014 |
| KR | 10-1396886 B1 | 5/2014 |

* cited by examiner

*Primary Examiner* — Richard M Camby
(74) *Attorney, Agent, or Firm* — Mintz Levin Cohn Ferris Glovsky and Popeo, P.C.; Peter F. Corless

(57) ABSTRACT

A vehicle that detects a lane using measurement data of a lidar sensor and a lane detection method are provided. The vehicle includes a distance sensor and a processor that is configured to determine data that indicates a road lane among data obtained by the distance sensor. Additionally, the processor accumulates the determined lane data using vehicle speed information and determines the road lane using the accumulated lane data.

18 Claims, 14 Drawing Sheets

VEHICLE AND LANE DETECTION METHOD FOR THE VEHICLE

CROSS-REFERENCE TO RELATED APPLICATION

This application claims the benefit of Korean Patent Application No. 10-2015-0123002, filed on Aug. 31, 2015 in the Korean Intellectual Property Office, the disclosure of which is incorporated herein by reference.

BACKGROUND

1. Field of the Invention

The present invention relates to a vehicle and, more particularly, to a lane detection method of a vehicle.

2. Description of the Related Art

Generally, driving assistance devices provide a function of assisting driving in a longitudinal direction such as adaptive cruise control (ACC) or a function of assisting driving in a lateral direction such as a lane departure warning system (LDWS) or a lane keeping assist system (LKAS). Recently, autonomous vehicles which are automatically operating in longitudinal/lateral directions without intervention of a driver have been developed.

The above information disclosed in this section is merely for enhancement of understanding of the background of the invention and therefore it may contain information that does not form the prior art that is already known in this country to a person of ordinary skill in the art.

SUMMARY

In one aspect, the present invention provides a vehicle which detects a lane using measurement data of a lidar sensor and a lane detection method. Additional aspects of the invention will be set forth in part in the description which follows and, in part, will be obvious from the description, or may be learned by practice of the invention.

In accordance with one aspect of the present invention, a vehicle may include a distance sensor and a processor configured to determine data that indicates a lane among data obtained by the distance sensor, accumulate the determined lane data using vehicle speed information, and determine a lane using the accumulated lane data.

The processor may be configured to remove data distributed in a lateral cluster among the data obtained by the distance sensor. The processor may further be configured to determine data measured at a distance equal to or greater than a predetermined distance from the distance sensor to be the data which indicates the lane. An average distance may be determined from data distributed in lateral clusters among the data obtained by the distance sensor to the distance sensor and a standard deviation. Additionally, the processor may be configured to determine data measured at a distance obtained by adding the standard deviation to the determined average distance or greater to be the data which indicates the lane.

The processor may further be configured to determine data with various data accumulated per distance, which is a predetermined reference number or less, among the data obtained by the distance sensor to be the data which indicates the lane. The processor may be configured to determine data that corresponds to an echo signal with a pulse width included within a predetermined range among echo signals received by the distance sensor to be the data which indicates the lane.

Further, the processor may be configured to determine data measured at a distance from the distance sensor, which is a predetermined distance or greater, which has various data accumulated per distance from the distance sensor, which is a predetermined reference value or less, and which corresponds to an echo signal with a pulse width included within a predetermined range among echo signals received by the distance sensor to be the data which indicates the lane.

The processor may be configured to add a weight that corresponds to a measurement sequence to the accumulated data and model the lane using the data added with the weight. Less weight may be added to data measured earlier among the accumulated data and the lane may be modeled using the data added with the weight which differs based on a measurement sequence. The processor may be configured to determine data which indicates road facilities which have shapes that correspond to a shape of the lane among the data obtained by the distance sensor and determine the lane using the data which indicates the road facilities.

In accordance with another aspect of the present invention, a lane detection method may include determining data which indicates a lane among data obtained by a distance sensor, accumulating the determined lane data using vehicle speed information, and determining the lane using the accumulated lane data.

Particularly, the determination of the data which indicates the lane among the data obtained by the distance sensor may include removing data distributed in lateral clusters from the data obtained by the distance sensor and determining data measured at a distance of a predetermined distance from the distance sensor or greater to be the data which indicates the lane. The determination of the data which indicates the lane among the data obtained by the distance sensor may include determining an average distance from data distributed in lateral clusters among the data obtained by the distance sensor to the distance sensor and a standard deviation and determining data measured at a distance obtained by adding the standard deviation to the determined average greater or more to be the data which indicates the lane.

The determination of the data which indicates the lane among the data obtained by the distance sensor may include determining data with various data accumulated per distance, which is a predetermined reference value or less, among the data obtained by the distance sensor to be the data which indicates the lane. The determination of the data which indicates the lane among the data obtained by the distance sensor may further include determining data that corresponds to an echo signal with a pulse width included within a predetermined range among echo signals received by the distance sensor to be the data which indicates the lane.

Additionally, the determination of the data which indicates the lane among the data obtained by the distance sensor may include determining data measured at a distance from the distance sensor, which is a predetermined distance or greater, which has various data accumulated per distance from the distance sensor, which is a predetermined reference value or less, and which corresponds to an echo signal with a pulse width included within a predetermined range among echo signals received by the distance sensor to be the data which indicates the lane.

A weight that corresponds to a measurement sequence may be added to the accumulated data and the lane may be modeled using the data added with the weight. Less weight may be added to data measured earlier among the accumulated data and the lane may be modeled using the data added with the weight which differs based on a measurement sequence. The determination of the lane using the accumulated lane data may include determining data which indicates road facilities which have shapes that correspond to a shape of the lane among the data obtained by the distance sensor and determining the lane using at least one of the data which indicates the road facilities and the accumulated lane data.

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION

Figure 1:
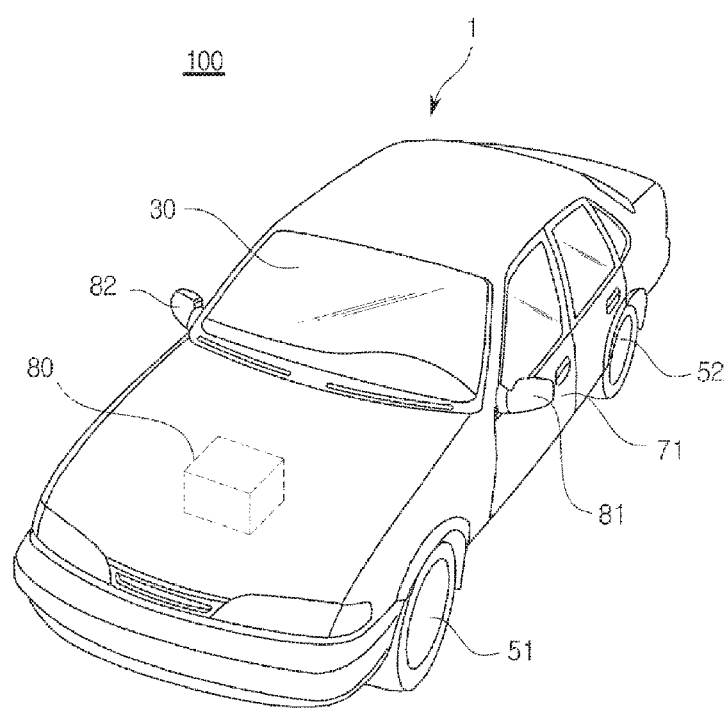
FIG. 1 is a perspective view illustrating an exterior of a vehicle in accordance with one exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a vehicle and a method of controlling the same in accordance with one exemplary embodiment of the present invention will be described with reference to the attached drawings.

Figure 2:
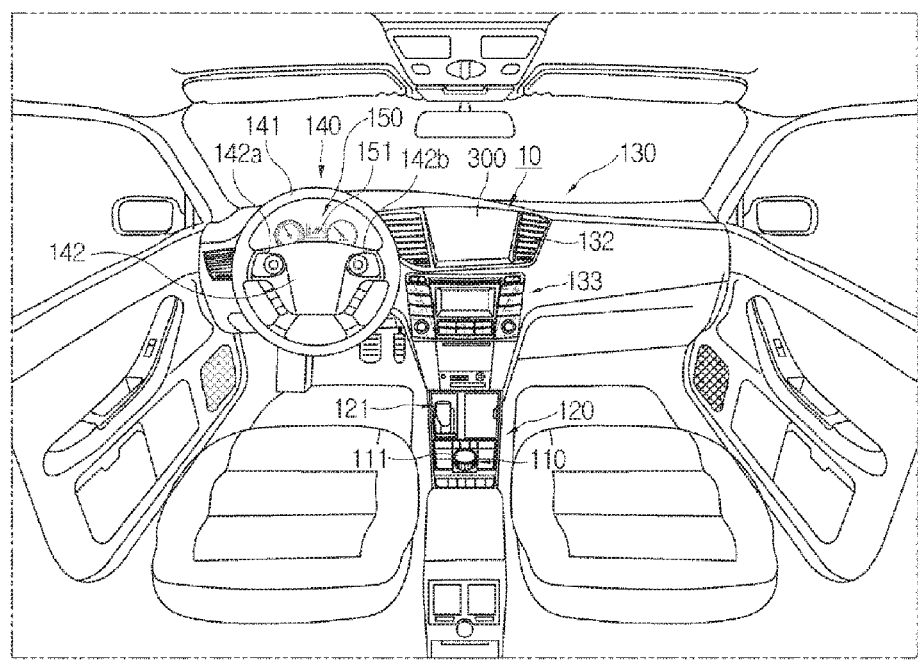
FIG. 2 is a view illustrating internal components of the vehicle in accordance with one exemplary embodiment of the present invention.

FIG. 1 is a perspective view illustrating an exterior of a vehicle 100 in accordance with one exemplary embodiment of the present invention. FIG. 2 is a view illustrating internal components of the vehicle 100 in accordance with one exemplary embodiment of the present invention.

Referring to FIG. 1, the vehicle 100 may include a body 1 which forms an external shape (e.g., appearance, etc.) of the vehicle 100, wheels 51 and 52 configured to move the vehicle 100, a driving apparatus 80 that allows the wheels 51 and 52 to spin, a door 71 that shields the inside of the vehicle 100 from the exterior, front glass 30 that provides a front view from within the vehicle 100, and side mirrors 81 and 82 which provide a rear view from within the vehicle 100. Notably, the vehicle may be operated by a controller (e.g., a central controller, upper controller, etc.) having a processor and a memory.

The wheels 51 and 52 include front wheels 51 disposed in the front of the vehicle 100 and rear wheels 52 disposed in the rear of the vehicle 100. The driving apparatus 80 may provide torque to the front wheels 51 or the rear wheels 52 to move the body 1 forward or backward. The driving apparatus 80 described above may employ one of an engine configured to generate the torque by burning fossil fuel or a motor configured to generate the torque by receiving power from a condenser (not shown).

The door 71 may be pivotably disposed on the left or right of the body 1 to allow ingress the vehicle 100 when opened and to shield an inside of the vehicle 100 when closed. The front glass 30 referred to as windshield glass is disposed on top in front of the body 1. Additionally, the side mirrors 81 and 82 may include a left side mirror 81 disposed on a left side of the body 1 and a right side mirror 82 disposed on a right side of the body 1. The driver in the vehicle 100 may view lateral and rear situations of the vehicle 100 using the side mirrors 81 and 82.

In addition, the vehicle 100 may include various sensors used to detect peripheral situations of the vehicle 100 by sensing obstructions around the vehicle 100. In particular, the vehicle 100 may include various sensors configured to sense driving information of the vehicle 100 such as a vehicle speed. The vehicle 100 may also include a sensor configured to capture images of surroundings of the vehicle 100 such as lane, etc. The various sensors capable of sensing the driving information of the vehicle 100 or peripheral situations of the vehicle 100 will be described below.

Referring to FIG. 2, the vehicle 100 may include a dashboard having a gearbox 120, a center fascia 130, a steering wheel 140, and a gauge panel 150. The gearbox 120 may include a gear lever 121 installed for shifting gears. As shown in FIG. 2, a dial operation unit 111 provided to allow a user to control performing functions of a multimedia device including a navigation device 10 or an audio device 133 or main functions of the vehicle 100 and an input unit 110 including various buttons may be installed on the gearbox 120.

Particularly, an air conditioning apparatus 132, the audio device 133, and the navigation device 10 may be installed on the center fascia 130. The air conditioning apparatus 132 may be configured to adjust a temperature, humidity, indoor air quality, and air flow in the vehicle 100 to maintain preset conditions within the vehicle 100. The air conditioning apparatus 132 may be installed in the center fascia 130 and may include at least one outlet through which air may be discharged. Various buttons and dials (or other input devices) to adjust the air conditioning apparatus 132, etc. may be installed on the center fascia 130. The user, such as the driver, may operate the air conditioning apparatus 132 of the vehicle 100 using the buttons or dials arranged on the center fascia 130. The air conditioning apparatus 132 may be operated using the buttons of the input unit 110 or the dial operation unit 111 installed on the gearbox 120.

According to exemplary embodiments, the navigation device 10 may be installed on the center fascia 130. The navigation device 10 may be embedded in the center fascia 130 of the vehicle 100. In addition, an input unit (e.g., an interface) for operating the navigation device 10 may be installed on the center fascia 130. The input unit of the navigation device 10 may be installed in another position in addition to the center fascia 130. For example, the input unit of the navigation device 10 may be formed around a display 300 of the navigation device 10. As another example, the input unit of the navigation device 10 may be installed on the gearbox 120.

The steering wheel 140 may be configured to adjust a driving direction of the vehicle 100 and may include a rim 141 gripped by the driver and spokes 142 connected to a steering device of the vehicle 100 and connect the rim 141 with a hub of a shaft for steering. The spokes 142 may include operation devices 142a and 142b used to operate various devices within the vehicle 100 such as the audio device 133. Additionally, the gauge panel 150 capable of displaying various gauges such as a driving speed, revolutions per minute of the engine, and a residual fuel amount may be installed on the dashboard. The gauge panel 150 may include a gauge panel display 151 configured to display a vehicle state, information related to vehicle driving, and information related to an operation of the multimedia device.

The vehicle 100 may be driven by operating the various devices provided on the dashboard described above. In the vehicle 100, in addition to the devices operable by the driver for driving the vehicle 100 as shown in FIG. 2, various sensors capable of sensing information extraneous to the vehicle 100 or driving information of the vehicle 100 necessary for driving the vehicle 100 may be provided.

The vehicle 100 in accordance with one exemplary embodiment of the present invention may be configured to perform autonomous driving based on information sensed by the various sensors without intervention of the driver. For autonomous driving, a road lane may be detected on which the vehicle 100 is being driven. In accordance with one exemplary embodiment of the present invention, a vehicle which detects a lane using a distance sensor 307 and a lane detection method are provided.

Figure 3:
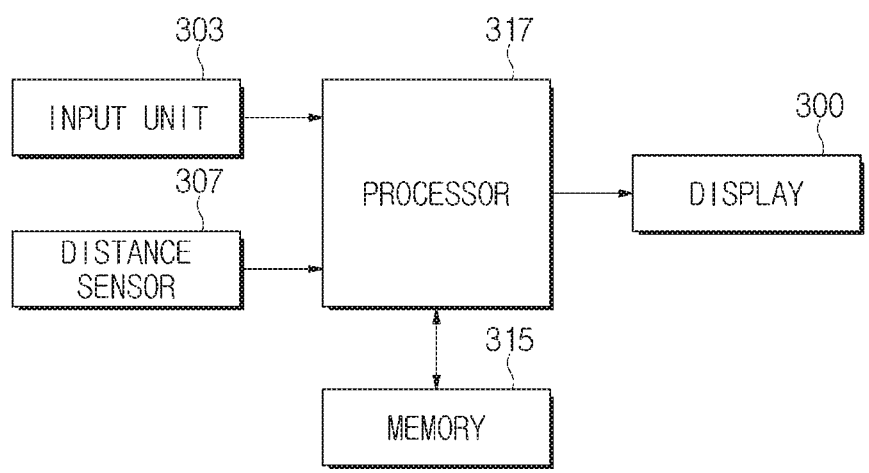
FIG. 3 is a control block diagram of the vehicle in accordance with one exemplary embodiment of the present invention.

Hereinafter, referring to FIGS. 3 to 8, the lane detection method in accordance with one exemplary embodiment of the present invention will be described in detail. FIG. 3 is a control block diagram of the vehicle 100 in accordance with one exemplary embodiment of the present invention. FIGS. 4A to 8B are views illustrating data obtained by the distance sensor 307 of the vehicle 100 in accordance with one exemplary embodiment of the present invention from a road on which the vehicle 100 runs.

As shown in FIG. 3, the vehicle 100 in accordance with one exemplary embodiment of the present invention may include an input unit 303 configured to receive an input related to an autonomous driving mode, the distance sensor 307 configured to sense surrounding vehicles or obstructions in front of the vehicle 100, a processor 317 configured to detect a lane of a driving road based on the information obtained by the distance sensor 307, and the display 300 configured to display various types of information related to driving of the vehicle 100.

In particular, the input unit 303 may be provided to receive user input for a command to turn on the autonomous driving mode. The input unit 303 may be disposed on a center fascia, a gearbox, or a steering wheel and may be embodied in various forms such as a button of a hard key type or a soft key type, a toggle switch, a dial, a voice recognition device, an operation recognition device, etc. The input unit 303 may be configured to receive an input for selecting any one of the autonomous driving mode and a manual driving mode in which the driver directly drives the vehicle 100.

In other words, the driver may select the autonomous driving mode by operating the input unit 303 while directly driving the vehicle 100 in the manual driving mode or may directly drive the vehicle 100 by selecting the manual driving mode while the vehicle 100 is driven in the autonomous driving mode. Accordingly, the vehicle may be switched between the manual mode and the autonomous driving mode based on user input. When a conversion between the autonomous driving mode and the manual driving mode is performed, the processor 317 may be configured to inform the driver of the conversion of mode through the display 300 or a speaker.

The distance sensor 307 may be configured to sense objects surrounding the vehicle 100, for example, preceding vehicles which travel in front of the vehicle 100, vehicles traveling behind the vehicle 100, a road, still objects which include structures on the road, and vehicles which approach in opposing lanes, etc. The distance sensor 307 in accordance with one exemplary embodiment of the present invention may be configured to calculate data including pavement information or lane information of the road by sensing lane markings on the road or signals reflected by a road surface. The distance sensor 307 of the vehicle 100 i may include radar or a light detection and ranging (e.g., lidar). Hereinafter, it is assumed that the distance sensor 307 is embodied as a multilayer lidar configured to vertically transmit a multilayer laser.

The processor 317 may be configured to detect a lane using the data calculated by the distance sensor 307 when a command for selecting the autonomous driving mode or commands for selecting a cruise control function, a lane departure warning function, a lane maintenance assistance function, etc. are input and received through the input unit 303. Otherwise, even when an additional command for executing the functions described above is not input, the processor 317 may be configured to detect the lane using the data calculated by the distance sensor 307 when the vehicle 100 is being driven.

Figure 4A:
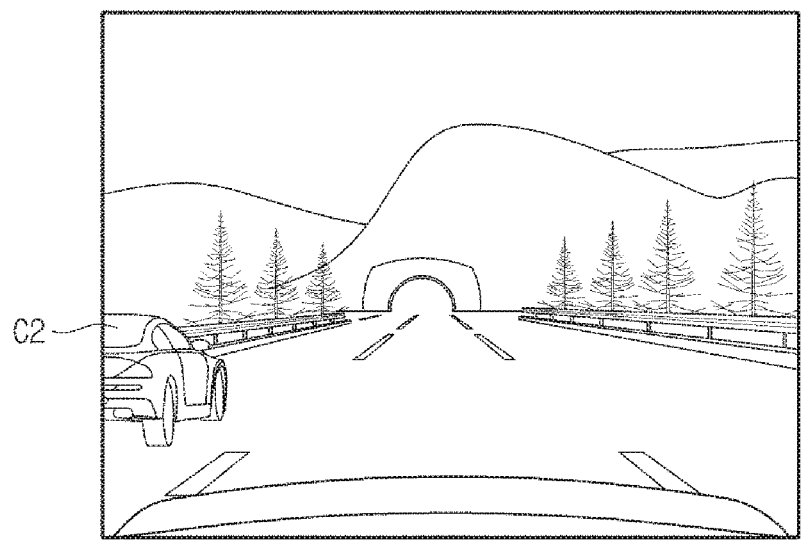
FIGS. 4A to 8B are views illustrating data obtained by a distance sensor of the vehicle in accordance with one exemplary embodiment of the present invention from a road on which the vehicle runs.
Figure 4B:
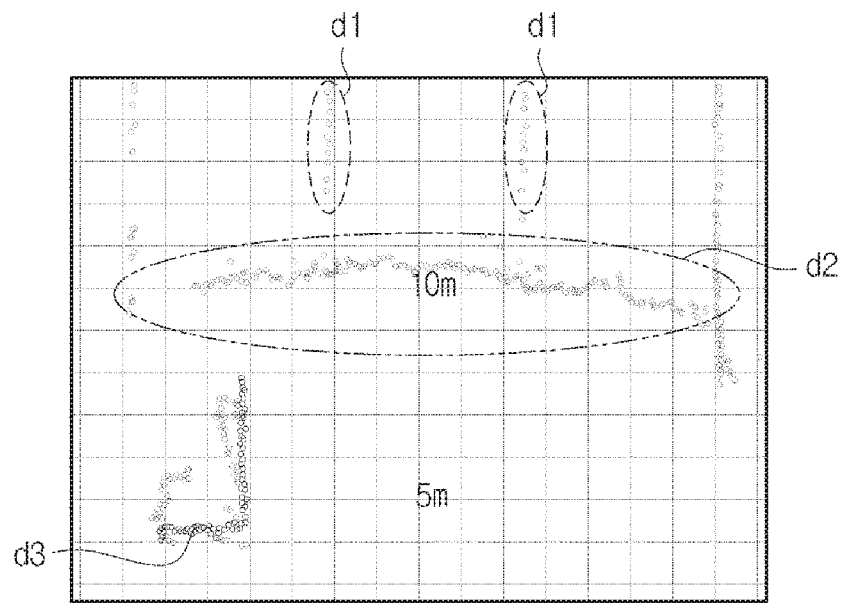

Referring to FIGS. 4A and 4B, data calculated by the distance sensor 307 may include dots which show the road surface, lane markings, or distances from preceding vehicles. In FIG. 4B, dots d3 in a left bottom indicate dots obtained by sensing a preceding vehicle c2 in a left bottom in FIG. 4A and dots d2 which form a lateral cluster indicate dots obtained by sensing the road surface. Additionally, dots d1 longitudinally arranged in a line indicate dots obtained by sensing lanes.

The processor 317 may be configured to detect the lanes using the data of the distance sensor 307 as shown in FIG. 4B. However, as described above, in addition to the dots obtained by sensing the lanes, dots obtained by sensing the road surface exist in the data calculated by the distance sensor 307, which may act as obstacles in detecting the lanes. The processor 317 in accordance with one exemplary embodiment of the present invention described above may be configured to remove or delete data d2 that shows the road surface from the data calculated by the distance sensor 307 to more precisely detect the lanes of the road.

In the data calculated by a lidar which is the distance sensor 307 (refer to FIG. 4B), data which forms a cluster similar to an arc and indicates the road surface is shown and data which indicates the lanes is shown in front thereof. As described above, since the data which indicates the road surface forms the arc-shaped cluster, that is, the lateral cluster and the data which indicates the lanes is shown in front of the data which indicates the road surface, the data which indicates the road surface may be removed using these properties.

Further, the processor 317 may be configured to calculate an average distance and a standard deviation of the data which forms the arc-shaped cluster and set a distance obtained by adding the standard deviation to the calculated average distance as a reference distance. To set the reference distance, the standard deviation may be multiplied by a predetermined gain. The processor 317 may be configured to determine the data which indicates the lanes based on whether a distance indicated by the data is equal to or greater than the predetermined reference distance (hereinafter, referred to as a first condition). The processor 317 may be configured to determine and remove the data that has a distance less than the set reference distance as the data that indicates the road surface and determine the data that has a distance equal to or greater than the reference distance as the data that indicates the lanes. The processor 317 may further be configured to detect the lanes from the data which has the distance equal to or greater than the reference distance.

Otherwise, the processor 317 may be configured to calculate a histogram which shows the number of pieces of data (e.g., various data points) based on changes in a longitudinal distance using the data calculated by the distance sensor 307. The histogram shows a rapid increase in the number of data points at a distance where the data that indicates the road surface clusters. The processor 317 may be configured to determine a distance where data exists less than a predetermined data number (hereinafter, referred to as a second condition) in the histogram to remove the data that indicates the road surface. The processor 317 may also be configured to remove data shown at the distance where data exists equal to or greater than a predetermined reference number and detect the lanes from other data.

As shown in FIG. 4B, since the data that indicates the road surface exists in the arc-shaped cluster at similar distances based on the distance sensor 307 unlike the data which indicates the lanes, the number of data points that indicate the road surface is greater than the number of data points hat indicate the lanes. Accordingly, the data that indicates the road surface may be removed using the histogram which shows the number of points based on the changes in the distance.

The processor 317 may be configured to set and previously store a range of the widths of echo pulses reflected by the lane markings and return and determine whether the widths of the echo pulses reflected by the road surface or the lane markings and return are present within the predetermined range (hereinafter, referred to as a third condition). When the widths of the echo pulses which are reflected and return are not present within the predetermined range, the processor 317 may be configured to determine that the data indicates the road surface and may remove the data.

As described above, to determine the data that indicates the lanes among the data calculated by the distance sensor 307, the processor 317 may be configured to determine data which satisfies any one of the first condition to the third condition described above as the data that indicates the lanes to detect the lanes or may be configured to determine data which satisfies any two of the first condition to the third condition as the data that indicates the lanes. Additionally, data which satisfies all of the first condition to the third condition may be determined to be the data that indicates the lanes.

When the data that indicates the lanes is determined using a process described above, the processor 317 may be configured to model the determined data through quadratic equations as following Equation 1 and Equation 2.

$$y = a_1 x^2 + b_1 x + c_1 \qquad \text{Equation (1)}$$

$$y = a_2 x^2 + b_2 x + c_2 \qquad \text{Equation (2)}$$

Equation 1 is a model for a left line of a lane in which a vehicle is traveling, and Equation 2 is a model for a right line of the lane in which the vehicle is traveling. The processor 317 may be configured to model the lanes by calculating parameters of the respective quadric equations by applying a least square method to the quadric equations.

Due to a limit of the distance sensor 307 embodied as the lidar in a field of view (FOV) in a vertical direction, lane data calculated by the distance sensor 307 may exist at a distance equal to or greater than about 10 m from the distance sensor 307 and an existence distance range is also limited. Hereupon, in accordance with one exemplary embodiment of the present invention, the lane data may be accumulated using vehicle speed information including a longitudinal speed, a lateral speed, and a yaw rate of the vehicle 100. The accumulated data may be stored in a memory 315. The memory 315 may include not only a volatile memory such as a static random access memory (S-RAM) and a dynamic random access memory (D-RAM) but also a nonvolatile memory such as a flash memory, a read-only memory (ROM), an erasable programmable read-only memory (EPROM), and an electrically EPROM (EEPROM).

Among the accumulated lane data, for data previously measured by the distance sensor 307, inaccuracies caused by errors of the vehicle speed information may also be accumulated. Accordingly, the processor 317 may be configured to reduce importance (e.g., priority) of the previously measured data by applying a weight when the least square method is applied. In other words, less weight may be applied to the previously measured data among the accumulated lane data, to reduce a priority of the data (e.g., cause the new data to be more relevant).

As described above, when the least square method is applied to lane models obtained through Equation 1 and Equation 2, a weight which varies based on a measurement sequence of the accumulated lane data may be applied, thereby more accurately detecting the lanes using data obtained by the distance sensor 307. In accordance with one exemplary embodiment of the present invention, the lanes may be detected using data related to the lanes obtained by the distance sensor 307 or using data related to road facilities which generally exist parallel to the lanes such as tunnel walls, curbs, guardrails, flexible pole lane dividers, etc., which are obtained by the distance sensor 307.

Figure 5A:
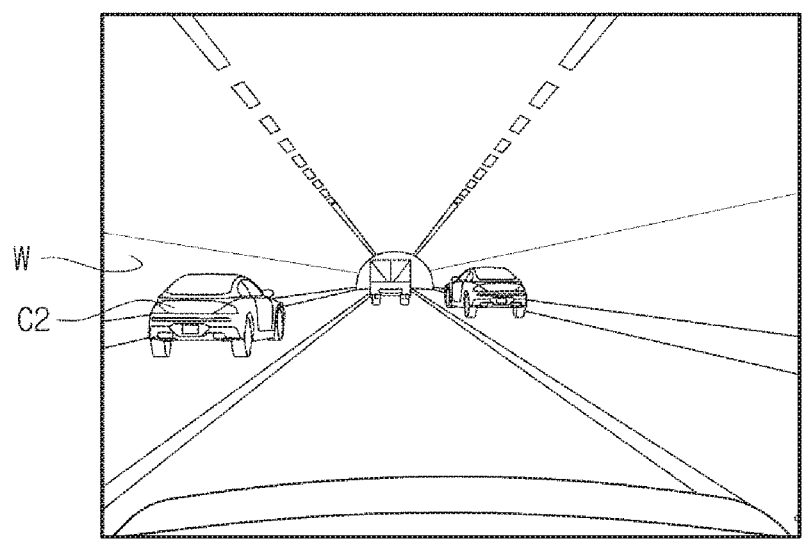
Figure 5B:
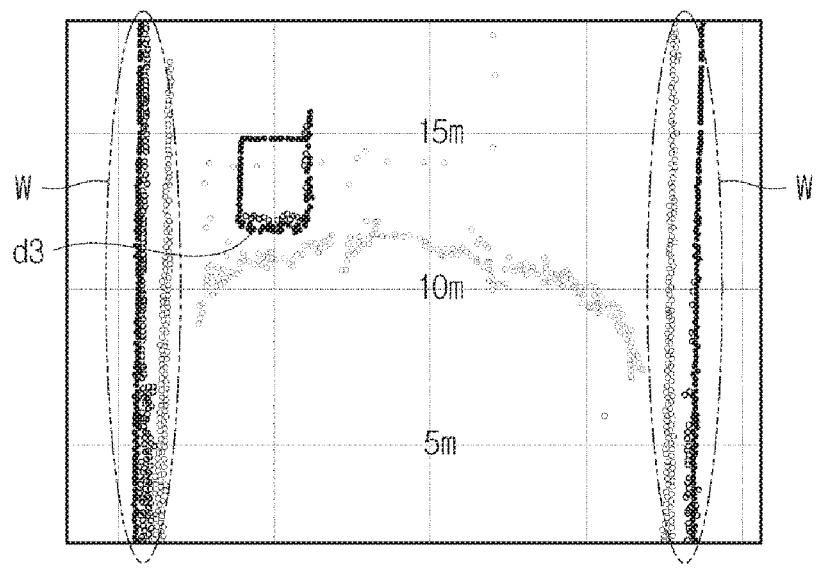

FIG. 5A illustrates a tunnel, and FIG. 5B illustrates data W related to the tunnel sensed by the distance sensor 307. As shown in FIG. 5B, among the data obtained by the distance sensor 307, the data W is present on left and right sides in a longitudinal direction. Such data may be calculated from signals reflected by tunnel walls and indicate the tunnel walls. Since the tunnel walls are generally formed parallel to the road, the processor 317 may be configured to detect lanes by modeling the data that indicates the tunnel walls using quadric equations as shown in Equation 1 and Equation 2 and applying the least square method thereto.

Figure 6A:
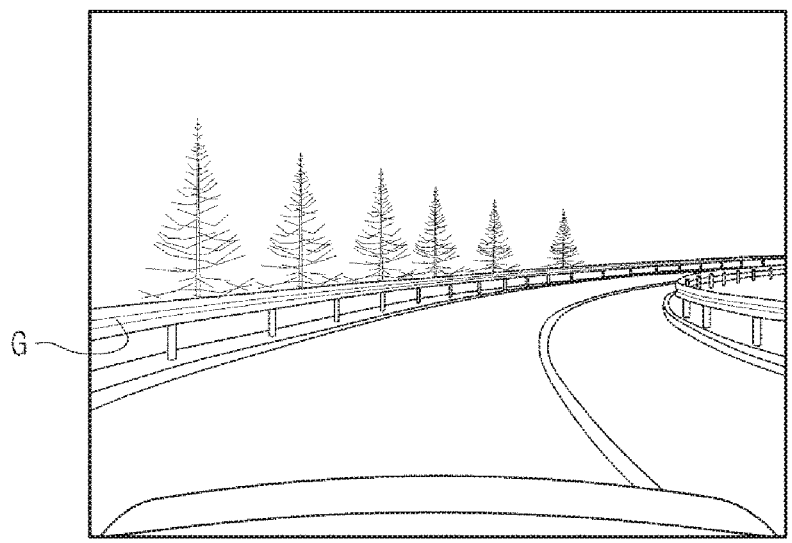
Figure 6B:
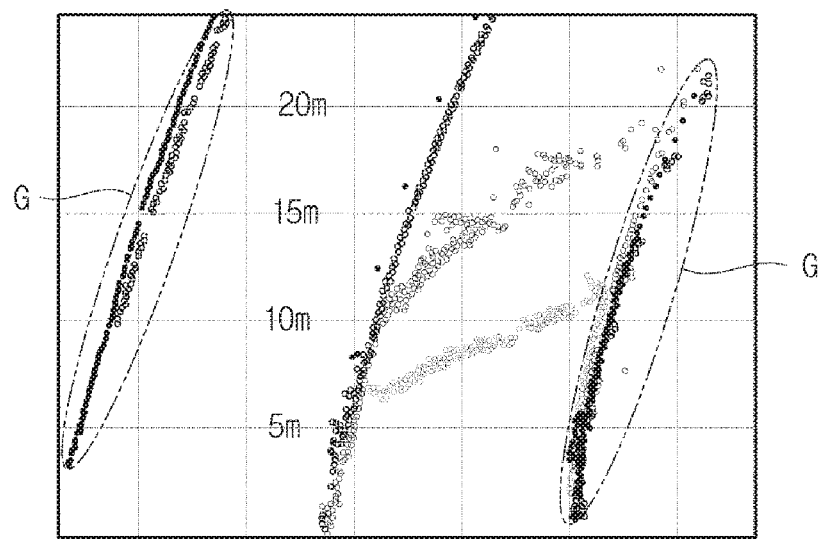

FIG. 6A illustrates guardrails, and FIG. 6B illustrates data G related to the guardrails sensed by the distance sensor 307. As shown in FIG. 6B, among the data obtained by the distance sensor 307, the data G is present on a left side while elongate in a longitudinal direction. Such data may be calculated from signals reflected by the guardrails and indicate the guardrails. Since the guardrails are also generally formed parallel to the road, the processor 317 may be configured to detect lanes by modeling the data that indicates the guardrails using quadric equations as shown in Equation 1 and Equation 2 and applying the least square method thereto.

Figure 7A:
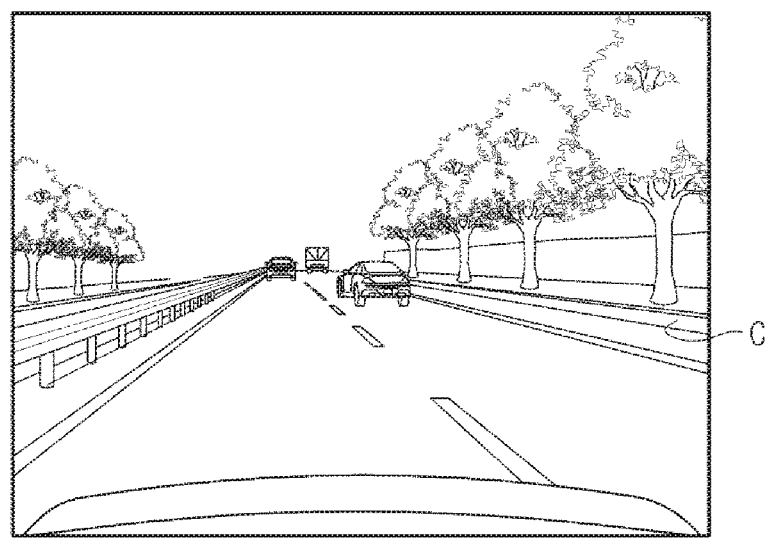
Figure 7B:
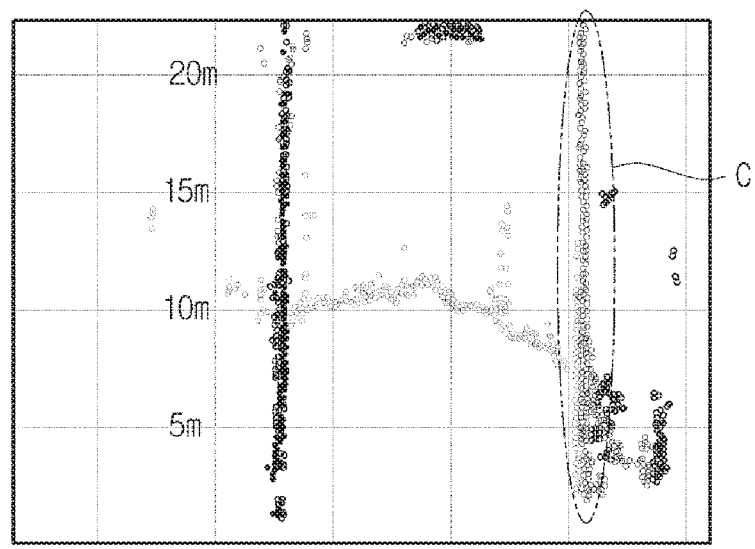

FIG. 7A illustrates curbs, and FIG. 7B illustrates data C related to the curbs sensed by the distance sensor 307. As shown in FIG. 7B, among the data obtained by the distance sensor 307, the data C is present on a right side while elongate in a longitudinal direction. Such data may be calculated from signals reflected by the curbs and indicate the curbs. Since the curbs are also generally formed parallel to the road, the processor 317 may be configured to detect lanes by modeling the data which indicates the curbs using quadric equations as shown in Equation 1 and Equation 2 and applying the least square method thereto.

Figure 8A:
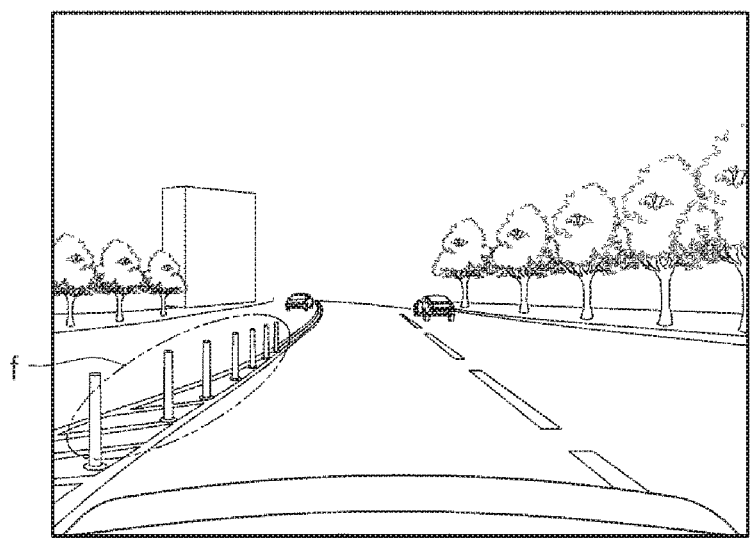
Figure 8B:
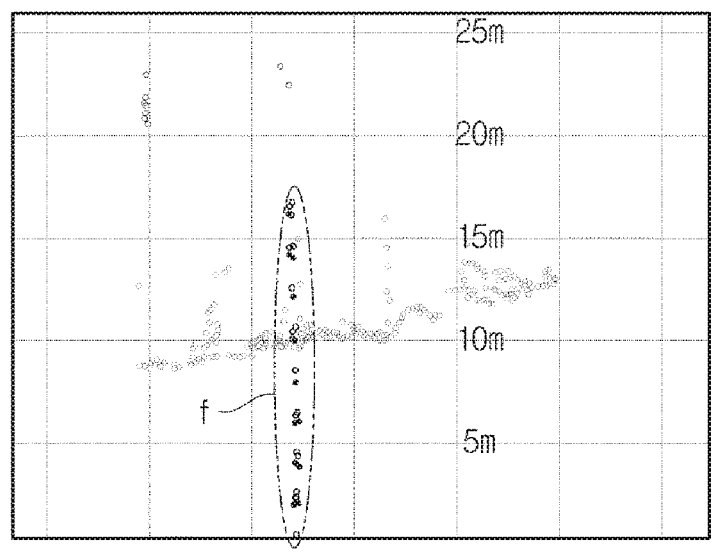

FIG. 8A illustrates flexible pole lane dividers, and FIG. 8B illustrates data f related to the flexible pole lane dividers sensed by the distance sensor 307. As shown in FIG. 8B, among the data obtained by the distance sensor 307, the data f is present on a left side at particular intervals within a specified distance in a longitudinal direction. Such data may be calculated from signals reflected by the flexible pole lane dividers and indicate the flexible pole lane dividers. Since the flexible pole lane dividers are also generally formed parallel to the road, the processor 317 may be configured to detect lanes by modeling the data which indicates the flexible pole lane dividers using quadric equations as shown in Equation 1 and Equation 2 and applying the least square method thereto.

The road facilities are not limited to the examples described above. Road facilities which are disposed parallel to the road may be included in the road facilities of the embodiment described above. The data calculated by the distance sensor 307 may include one or more road facilities described above. In particular, the processor 317 may be configured to detect lanes by selecting any one of the data that indicates the respective road facilities or by combining the respective data which indicates the road facilities.

When the data calculated by the distance sensor 307 includes data related to road facilities, the processor 317 may be configured to detect lanes using the data related to the road facilities. When the data related to the road facilities is not included, lanes may be detected using lane data. Since lane marking states of all roads may not be satisfactory to detect lanes, when the data related to the road facilities described above is present in the data obtained by the distance sensor 307, lanes may be detected using the data related to road facilities which are relatively stably detectable.

Figure 9:
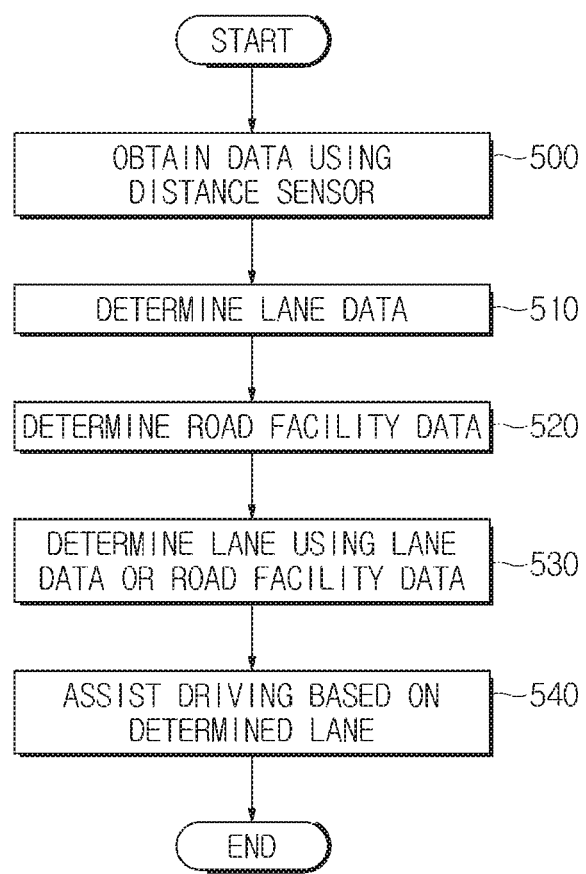
FIG. 9 is a flowchart illustrating a lane detection method in accordance with one exemplary embodiment of the present invention.

FIG. 9 is a flowchart illustrating a lane detection method in accordance with one exemplary embodiment of the present invention. As shown in FIG. 9, when the distance sensor 307 obtains data (S500), the processor 317 may be configured to determine lane data and road facility data (S510 and S520).

Referring to FIG. 4, data calculated by the distance sensor 307 may include dots which show a road surface, lane markings, or distances from preceding vehicles. In FIG. 4B, dots in a left bottom indicate dots obtained by sensing a preceding vehicle c2 in a left bottom in FIG. 4A and dots which form a lateral cluster indicate dots obtained by sensing the road surface. Additionally, dots longitudinally arranged in a line indicate dots obtained by sensing lanes.

The processor 317 may be configured to detect the lanes using the data of the distance sensor 307 as shown in FIG. 4B. However, as described above, in addition to the dots obtained by sensing the lanes, the dots obtained by sensing the road surface exist in the data calculated by the distance sensor 307, which may act as obstacles in detecting the lanes. Hereupon, the processor 317 may be configured to remove data which shows the road surface from the data calculated by the distance sensor 307 to more accurately detect the lanes of the road.

In data calculated by the lidar which is the distance sensor 307 (refer to FIG. 4B), data which forms a cluster similar to an arc and indicates the road surface is shown and data which indicates the lanes is shown in front thereof. As described above, since the data that indicates the road surface forms the arc-shaped cluster, that is, the lateral cluster and the data that indicates the lanes is shown in front of the data that indicates the road surface, the data that indicates the road surface may be removed using these properties.

The processor 317 may be configured to calculate an average distance and a standard deviation of the data which forms the arc-shaped cluster and set a distance obtained by adding the standard deviation to the calculated average distance as a reference distance. To set the reference distance, the standard deviation may be multiplied by a predetermined gain. The processor 317 may be configured to determine the data which indicates the lanes based on whether a distance indicated by the data is equal to or greater than the predetermined reference distance (the first condition). The processor 317 may then be configured to determine and remove the data which has a distance less than the set reference distance as the data that indicates the road surface and determine the data which has a distance equal to or greater than the reference distance as the data that indicates the lanes. The processor 317 may be configured to detect the lanes from the data which has the distance equal to or greater than the reference distance.

Otherwise, the processor 317 may be configured to calculate a histogram which shows the number of data points based on changes in a longitudinal distance using the data calculated by the distance sensor 307. The histogram shows a rapid increase in the number of data points at a distance where the data that indicates the road surface clusters. The processor 317 may be configured to determine a distance where data exists less than a predetermined data number (the second condition) in the histogram to remove the data that indicates the road surface. Additionally, the processor 317 may be configured to remove data shown at the distance where data exists equal to or greater than a predetermined reference number and may be configured to detect the lanes from other data.

As shown in FIG. 4B, since the data that indicates the road surface exists in the arc-shaped cluster at similar distances based on the distance sensor 307 unlike the data which indicates the lanes, the number of data points that indicates the road surface is greater than the number of data points that indicates the lanes. Accordingly, the data that indicates the road surface may be removed using the histogram which shows the number of data points based on the changes in the distance.

Further, the processor 317 may be configured to set and previously store a range of the widths of echo pulses reflected by the lane markings and return and determine whether the widths of the echo pulses reflected by the road surface or the lane markings and return are within the predetermined range (the third condition). When the widths of the echo pulses reflected and return are not within the predetermined range, the processor 317 may be configured to determine that the data indicates the road surface and remove the data.

As described above, to determine the data that indicates the lanes among the data calculated by the distance sensor 307, the processor 317 may be configured to determine data which satisfies any one of the first condition to the third condition described above as the data that indicates the lanes to detect the lanes or may be configured to determine data which satisfies any two of the first condition to the third condition as the data which indicates the lanes. Additionally, data which satisfies all of the first condition to the third condition may be determined to be the data which indicates the lanes.

The processor 317 may be configured to detect the lanes using data related to the lanes obtained by the distance sensor 307 or using data related to road facilities which generally exist parallel to the lanes such as tunnel walls, curbs, guardrails, flexible pole lane dividers, etc., which are obtained by the distance sensor 307. Accordingly, the processor 317 may be configured to determine the data that indicates road facilities parallel to the lanes among the data obtained by the distance sensor 307.

When the lane data or the road facility data is determined, the processor 317 may be configured to determine the lanes using the lane data or the road facility data (S530) and assist driving of the vehicle 100 based on the determined lanes (S540). When the data that indicates the lanes is determined using the process described above, the processor 317 may be configured to model the determined data using quadratic equations as shown in Equation 1 and Equation 2 described above.

Equation 1 is a model for a left line of a lane in which a vehicle is traveling, and Equation 2 is a model for a right line of the lane in which the vehicle is traveling. The processor 317 may be configured to model the lanes by calculating parameters of the respective quadric equations by applying the least square method to the quadric equations.

Due to a limit of the distance sensor 307 embodied as the lidar in an FOV in a vertical direction, lane data calculated by the distance sensor 307 may exist at a distance equal to or greater than about 10 m from the distance sensor 307 and an existence distance range is limited. Hereupon, in accordance with one exemplary embodiment of the present invention, the lane data may be accumulated using vehicle speed information including a longitudinal speed, a lateral speed, and a yaw rate of the vehicle 100.

Among the accumulated lane data, in the case of data previously measured by the distance sensor 307, inaccuracies caused by errors of the vehicle speed information may also be accumulated. Accordingly, the processor 317 may be configured to reduce importance (e.g., priority) of the previously measured data by applying a weight when the least square method is applied. In other words, less weight may be applied to the previously measured data among the accumulated lane data, to reduce the priority of the previously measured data.

As described above, when the least square method is applied to lane models obtained using Equation 1 and Equation 2, a weight which varies based on a measurement sequence of the accumulated lane data may be applied to more accurately detect the lanes using the data obtained by the distance sensor 307. Otherwise, the processor 317 may be configured to detect the lanes by modeling data which indicates road facilities such as tunnel walls, guardrails, curbs, or flexible pole lane dividers using quadric equations as shown in Equation 1 and Equation 2 described above and applying the least square method thereto.

When the data calculated by the distance sensor 307 includes data related to road facilities, the processor 317 may be configured to detect lanes using the data related to the road facilities. When the data related to the road facilities is not included, lanes may be detected using lane data. Since lane marking states of all roads may not be satisfactory to detect lanes, when the data related to the road facilities described above is present in the data obtained by the distance sensor 307, the lanes may be detected using the data related to road facilities which are relatively stably detectable. When the lanes are determined, the processor 317 may be configured to assist the driver in driving the vehicle 100 or execute autonomous driving of the vehicle 100 using the determined lanes while the vehicle 100 is driven in the autonomous driving mode.

As is apparent from the above description, a vehicle and a lane detection method in accordance with one exemplary embodiment of the present invention may detect a lane using a lidar without an imaging device (e.g., camera, video camera, etc.). Additionally, coupled with a camera-based lane detection function, a more highly reliable lane detection function may be provided.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A vehicle, comprising:
 a distance sensor; and
 a processor configured to determine data that indicates a road lane among data obtained by the distance sensor, accumulate the determined lane data using speed information of the vehicle, and determine the road lane using the accumulated lane data, wherein the processor is configured to remove data distributed in a lateral cluster among the data obtained by the distance sensor.

2. The vehicle of claim 1, wherein the processor is configured to determine data measured at a distance equal to or greater than a predetermined distance from the distance sensor to be the data that indicates the road lane.

3. The vehicle of claim 1, wherein the processor is configured to determine an average distance from data distributed in lateral clusters among the data obtained by the distance sensor to the distance sensor and a standard deviation and determine data measured at a distance obtained by adding the standard deviation to the determined average distance or greater to be the data that indicates the road lane.

4. The vehicle of claim 1, wherein the processor is configured to determine data with a number of data points accumulated per distance, which is a predetermined reference number or less, among the data obtained by the distance sensor to be the data that indicates the road lane.

5. The vehicle of claim 1, wherein the processor is configured to determine data that corresponds to an echo signal with a pulse width included within a predetermined range among echo signals received by the distance sensor to be the data that indicates the road lane.

6. The vehicle of claim 1, wherein the processor is configured to determine data measured at a distance from the distance sensor, which is a predetermined distance or greater, which has a number of data points accumulated per distance from the distance sensor, which is a predetermined reference value or less, and which corresponds to an echo signal with a pulse width included within a predetermined range among echo signals received by the distance sensor to be the data that indicates the road lane.

7. The vehicle of claim 1, wherein the processor is configured to add a weight that corresponds to a measurement sequence to the accumulated data and models the road lane using the data added with the weight.

8. The vehicle of claim 1, wherein the processor is configured to add less weight to data previously measured among the accumulated data and model the road lane using the data added with the weight which differs based on a measurement sequence.

9. The vehicle of claim 1, wherein the processor is configured to determine data that indicates road facilities which have shapes that correspond to a shape of the road lane among the data obtained by the distance sensor and determine the road lane using the data that indicates the road facilities.

10. A lane detection method, comprising:
  determining, by a processor, data which indicates a road lane among data obtained by a distance sensor on a vehicle;
  accumulating, by the processor, the determined road lane data using speed information of the vehicle; and
  determining, by the controller, the road lane using the accumulated road lane data,
  wherein the determination of the data that indicates the road lane among the data obtained by the distance sensor includes removing, by the processor, data distributed in lateral clusters from the data obtained by the distance sensor.

11. The method of claim 10, wherein the determination of the data that indicates the road lane among the data obtained by the distance sensor includes:
  determining, by the processor, data measured at a distance of a predetermined distance from the distance sensor or greater to be the data that indicates the road lane.

12. The method of claim 10, wherein the determination of the data that indicates the road lane among the data obtained by the distance sensor includes:
  determining, by the processor, an average distance from data distributed in lateral clusters among the data obtained by the distance sensor to the distance sensor and a standard deviation; and
  determining, by the processor, data measured at a distance obtained by adding the standard deviation to the determined average distance or greater to be the data that indicates the road lane.

13. The method of claim 10, wherein the determination of the data that indicates the road lane among the data obtained by the distance sensor includes:
  determining, by the processor, data with a number of data points accumulated per distance, which is a predetermined reference value or less, among the data obtained by the distance sensor to be the data that indicates the road lane.

14. The method of claim 10, wherein the determination of the data that indicates the road lane among the data obtained by the distance sensor includes:
  determining, by the processor, data that corresponds to an echo signal with a pulse width included within a predetermined range among echo signals received by the distance sensor to be the data that indicates the road lane.

15. The method of claim 10, wherein the determination of the data that indicates the road lane among the data obtained by the distance sensor includes:
  determining, by the processor, data measured at a distance from the distance sensor, which is a predetermined distance or greater, which has a number of the data points accumulated per distance from the distance sensor, which is a predetermined reference value or less, and which corresponds to an echo signal with a pulse width included within a predetermined range among echo signals received by the distance sensor to be the data that indicates the road lane.

16. The method of claim 10, wherein the determination of the road lane using the accumulated road lane data includes:
  adding, by the processor, a weight that corresponds to a measurement sequence to the accumulated data; and
  modeling, by the processor, the road lane using the data added with the weight.

17. The method of claim 10, wherein the determination of the road lane using the accumulated road lane data includes:
  adding, by the processor, less weight to data previously measured among the accumulated data; and
  modeling, by the processor, the road lane using the data added with the weight which differs based on a measurement sequence.

18. The method of claim 10, wherein the determination of the road lane using the accumulated road lane data includes:
  determining, by the processor, data that indicates road facilities which have shapes that correspond to a shape of the road lane among the data obtained by the distance sensor; and
  determining, by the processor, the road lane using at least one of the data that indicates the road facilities and the accumulated lane data.

* * * * *